United States Patent [19]

Lancy

[11] 4,045,171
[45] Aug. 30, 1977

[54] TREATMENT OF DYE WASTES

[75] Inventor: Leslie Emery Lancy, Ellwood City, Pa.

[73] Assignee: Dart Industries Inc., Los Angeles, Calif.

[21] Appl. No.: 563,026

[22] Filed: Mar. 28, 1975

[51] Int. Cl.² .............................................. D06P 5/10
[52] U.S. Cl. .............................................. 8/74; 8/81;
210/28; 210/40; 210/42 R; 210/59; 210/60; 210/62
[58] Field of Search ............... 8/81, 74; 210/28, 40, 210/42, 59, 60, 62

[56] References Cited

U.S. PATENT DOCUMENTS

| 3,502,577 | 3/1970 | Hutchins et al. | 210/59 |
|---|---|---|---|
| 3,829,380 | 8/1974 | Oohara | 210/30 |
| 3,944,383 | 3/1976 | Davis | 8/80 |
| 3,947,248 | 3/1976 | Powers | 8/81 |

FOREIGN PATENT DOCUMENTS

| 1,297 of | 1858 | United Kingdom | 8/81 |

*Primary Examiner*—John Kight, III
*Attorney, Agent, or Firm*—Margareta LeMaire; Bryant W. Brennan; Fred S. Valles

[57] ABSTRACT

A process is disclosed for the removal of colorants from industrial dye waste solutions which involves the treatment of the waste with a solution of a Group IA or IIA metal halide or sulfate to precipitate the colorant, which subsequently is removed by common solid separation techniques as a dense material of relatively high solids content. The process is particularly suitable for integration into a dyeing process to increase color fastness of the dyed article.

10 Claims, No Drawings

TREATMENT OF DYE WASTES

BACKGROUND OF THE INVENTION

Discharge of rinse waters associated with dyeing processes results in the discoloration of large volumes of water from which the pigment or colored matter cannot be easily removed. The American textile industry alone consumes several million pounds of dye each year, and a substantial portion thereof finds its way into various waste streams. Current treatment methods for these waste streams may be classed as biological or physical-chemical in nature.

Bacterial degradation and coagulation of dye wastes occurs in sanitary sewage treatment, but here, acceptability of the dye waste is dependent upon the percentage of dye that can be removed in the treatment. In many cases dye wastes are just too resistant to undergo microbial degradation in the time required for conventional waste treatment, and in some cases the resultant treatment products may be more toxic than the original material. As a result, biological processes may be unable to provide sufficient treatment for dye wastes to produce a product that is free of visible tint and toxic residuals.

Several physical or chemical methods for the treatment of dye wastes are known, but these systems seem to suffer from either low practical efficiency or associated high costs. Common treatments in this realm consist of trying to absorb the colored matter on freshly precipitated metal hydroxides, or coagulated polymeric materials, or on clay particles. The color removal in these systems is not complete and is dependent upon the total amount of coagulant or adsorbent material added in the treatment. The greater the addition of coagulant or adsorbent, the better the color removal; however, large additions of these materials results in the production of copious amounts of colored sludge that may contain only a few percent dry solids; and thereby, creates sludge disposal problems. Waste dye preparations and rinse waters may also be purified by adsorption of the colored matter on activated carbon. This method has been found to be effective, but the high costs associated with the activated carbon adsorption process most often renders it an unfeasible option. Some efforts have also been made to degrade dyestuffs by electrochemical means; however, the power consumption necessary for color removal also makes this an expensive solution to the dye waste problem.

In processes for the dyeing of textile articles, such as fibers, cloths and yarns etc., the dyed article is customarily subjected to a subsequent treatment with an inorganic salt solution to set the dye in the pores of the article thereby rendering color fastness to the article. For this purpose the dyed article is first rinsed with water and subsequently treated with a salt solution of a concentration from 30 to about 80 g/liter. After use both the rinse water and the salt solution, which now is colored as a result of the treatment, are discharged to the environment. In many instances this discharge poses a serious problem for the processor especially when the soluble solids concentration of the effluents from the overall process approaches the maximum tolerable limit in accordance with local prevailing pollution control standards.

It is therefore an object of the present invention to provide a process for the waste removal of colorants from effluent streams.

It is another object of the invention to provide a process for the pollution-free removal of excess colorants from dyed articles which process is integrated with the dyeing process and can result in increased color fastness of the dyed article.

Other objects of the invention will become apparent from the disclosure and appended claims.

THE INVENTION

In accordance with the present invention, the aforementioned objects are attained by treating an aqueous solution containing a dye with a salt solution to form a precipitate of the dye and separating the precipitate from said salt solution. The treatment solution, i.e. the salt solution, is thereby rendered nearly colorless and can be used repeatedly in this precipitation process and any subsequent rinse water employed after this treatment can be kept substantially free of color.

The invention is applicable to treatment of any waste solution containing colorants and dyes of various compositions including direct, acid, alkaline, dispersed dyes and the like, in other words, the particular dye used is not important in this invention. It is to be understood that the waste solutions referred to above include excess dye solution adhering to the surface of an article removed from a dye bath. The shape of the article and the particular composition of the material from which the dyed article is formed is not important, i.e., the invention is applicable to a variety of articles, such as fibers, cloths, yarns, sheets, films; extruded, molded, and other shaped articles made from synthetic resins, cellulose, natural fibers and the like. For the purpose of this invention, the term "article" is intended to cover all of the above. The conditions used in dyeing the article are also not important to the present invention.

Although not so limited the invention will be described in detail as it pertains to a process sequence wherein a dyed article is moved from one treatment zone to another.

After immersion in the dye solution for the time necessary to impart color to the article, it is removed therefrom and subsequently transferred to a precipitation zone and contacted with the aforementioned salt solution. In removing the article from the dye bath, a certain amount of the dye solution is also removed ("drag-out"), i.e. an amount of excess dye solution adheres to the surface of the article. In the precipitation zone this "drag-out" is rinsed from the article and the excess dye is simultaneously precipitated from the salt solution. This process step will also result in setting the color, where color fastness of the dyed article is a desirable feature, such as is the case with fibers, yarns, cloths and other similar articles of manufacture. In order to effect precipitation the concentration of salt in the precipitation zone should vary from at least 100 g/liter zone to near saturation based on the total volume of liquid present in the precipitation zone.

Any one of the salts selected from halides or sulfates of the metals of Group IA or IIA of the Periodic Chart can be used, having a solubility of above 100 g/liter of water at room temperature such as sodium chloride, potassium chloride, calcium chloride, magnesium chloride, sodium sulfate, etc., or mixture of these salts.

Because of their availability at relatively low cost and their slightly better performance in the process, the halides are the preferred salts especially the chlorides of sodium, potassium and magnesium. The preferred concentration of the chlorides in the precipitation zone is between about 200–340 gms/liter.

The precipitation zone can be a vessel of any suitable shape, preferably equipped with agitation means to assure intimate contact between the dyed article and the salt solution.

The zone can be operated on an intermittent basis or a continuous basis. For instance, in batch dyeing or in piece dyeing of relatively large articles, the precipitation zone may be operated as a combination precipitation-settling zone, i.e. after removal of the dyed article from the zone, the contents therein are allowed to settle after which the settled precipitate is separated either by simple bottoms withdrawal or by filtration or centrifugation, in which latter cases the liquid phase is returned to the contact zone for reuse.

In treating articles dyed in a continuous dye process, the precipitation zone is advantageously also operated in a continuous fashion by recirculation of the salt solution through a separate settling zone and/or filtration or centrifugation zone to remove the precipitated dye.

Although the dye stuffs precipitated by the salt solution can be removed as such by settling or filtration techniques, it was found that the settling and filtration rates improved considerably with the addition of relatively small amounts of adsorbent material such as diatomaceous earth as well as other materials commonly used as filter or settling aids, e.g., sand, clay, carbon or any combination thereof. It is not important where the absorbent material is added, for instance, where the precipitated dyestuff is removed by filtration, the filter may be precoated with the adsorbent, which then serves as a base or support for the build-up of a solid filter cake, which can be easily removed on a periodic basis. Alternately, the adsorbent may be added on an intermittent or continuous basis to the salt solution either before or after the precipitation and the solids are then separated either by filtration or settling. In any case, the addition of the adsorbent aids in the removal of the precipitated dye stuffs in the form a highly dense material of relatively high solids content, which can easily be disposed of without causing pollution problems. In addition it also serves to remove any residual dye stuff of minute particle size that may still be suspended in the salt solution after precipitation.

After the work piece or article has been removed from the precipitation zone, it may be dried without any further treatment or rinsed with water in one or more rinse zones and then dried. Inasmuch as there always is a certain amount of salty "drag-out" adhering to the article as it enters the rinse vessel and which will cause build up of salts in the vessel containing the rinse water, it is preferred to treat the rinse water on an intermittent or continuous basis by reverse osmosis or ion exchange to avoid excessive salt build-up. The salt thus recovered by said treatment is advantageously recycled to the precipitation zone, thus minimizing the need for adding fresh make-up salt thereto and also enables repeated use of the rinse water within the process. If desired, the article may be subjected to additional rinses, however, in view of the relative low concentration of salt in the "drag-out" from the first rinse vessel, additional salt recovery from any such subsequent rinse vessel usually becomes uneconomical. The disposal of the final rinse water will cause no environmental problem in that it is essentially free of dye stuffs and only contains very minor amounts of harmless salts. Thus the process compares very favorably with the prior art systems, from an effluent salt load standpoint. As mentioned before, where additional salt treatment is carried out in conventional processes, the dyed article is immersed in a 30–80 g/l salt solution after it has been rinsed with water following the dyeing step. This solution is discharged to the environment after each time it has been used.

It is also within the scope of the invention to employ a process scheme wherein the article or work piece is stationary, i.e. the same vessel is used for dyeing, precipitation and optionally rinsing. In this case, the respective solutions of dye and salt and the rinse water are kept until needed in separate holding tanks equipped with means for circulating fluid between each holding tank and the main vessel.

The invention can also be used to dispose of colored matter from rinse waters resulting from e.g. periodic equipment "wash-downs" between changes in dye-solutions in the dye vessel. In this case, the wash down rinse is added to the salt solution in the precipitation zone and treated as described above. The inherent dilution and increased volume of the salt solution must be compensated for by addition of an appropriate amount of salt to maintain the salt concentration above the minimum effective value and/or by partial evaporation to return the salt solution to about its original volume.

The attention needed to carry out the process of the invention is surprisingly small, especially in the case of continuous operations. The liquid inventory is relatively stable since usually the volume of liquid "drag-in" entering a treatment zone is substantially equal to the "drag-out" from said zone. Naturally, some liquid is lost from the system with the precipitate removed and also through other causes such as evaporation etc. Water is therefore usually added to the system in appropriate locations to compensate for these losses. A simple periodic specific gravity check should give sufficient information for the maintenance of the desired salt concentration in the precipitation zone. In cases where the dye wastes are acidic or basic in nature, an occasional adjustment of the pH may be necessary. This would be especially important in applications where the dyed fibers could be damaged by excessive build-up of acids or bases in the salt solution in the precipitation zone. If the pH becomes too high, then common mineral acids, such as hydrochloric or sulfuric acid, can be added until the pH is brought into an acceptable range. If the pH falls below the desired range, bases such as sodium or potassium hydroxide be applied to the solution until the appropriate increase in the pH value is achieved. Control of pH may be achieved either by manual test and additions, or the process can be automated.

The invention is illustrated but in no way limited by the following examples.

EXAMPLES 1–3

The dyes used in these examples were commercial, all purpose dyes which were prepared at concentrations recommended by the manufacturers. All-purpose dyes were chosen because they are known to be mixtures of direct, acid and dispersed dyes, which all are used in dyeing of a wide variety of natural and synthetic fibers.

The simulate a 10 percent drag-in of a dye preparation from a dye bath into a treatment solution, a 100 ml sample of Rit® Cocoa Brown No. 25 was added to one liter of a 300 g/l sodium chloride solution. The absorbance of this solution at 396 nanometers was measured immediately after the addition of the dye on a Varian Techtron® Model 635 spectrophotometer. A five gram portion of diatomaceous earth (Celite Hysorb B®) was added to the treatment solution and it was stirred for thirty minutes. The solution was then vacuum filtered (12 inches mercury) and the absorbance of the filtrate was measured. The weight percents of dye present in the treatment solution before and after filtration, as presented in Table I, were obtained by comparison of the absorbance measurements to a standard curve prepared for this dye. As indicated in Table I, these values showed 93 percent removal of the dye originally placed in the treatment solution.

To demonstrate the ability to reuse the treatment solution and the diatomaceous earth, similar 100 ml additions of Tintex® Scarlet Red No. 34 and Tintex® Purple were made. In these cases the dye preparations were added to the salt bath, allowed to stand for ten minutes, and then vacuum filtered through the same diatomaceous earth used for the Cocoa Brown No. 25. As before, an absorbance measurement was taken on the treatment solution before and after filtration for each of these dyes (at 482 nanometers for Scarlet Red No. 34 and at 545 nanometers for the Purple). The reduction of the weight percent concentration of the dye present in the treatment bath was again obtained by comparison of these absorbance measurements to standard curves prepared for each dye. As indicated in Table I, both cases showed a 99 percent removal of the dye placed in the treatment bath.

TABLE I

| Ex. | Dye | Weight % of Dye Initial | Weight of Dye Final | % Dye Removed |
|---|---|---|---|---|
| 1 | Cocoa Brown No. 25 | 0.076 | .005 | 93 |
| 2 | Scarlet Red No. 34 | .13 | .002 | 99 |
| 3 | Purple | 0.16 | .0002 | 99 |

EXAMPLES 4-6

These examples were carried out to demonstrate that solutions of halides and sulfates of Group IA and Group IIA metals are generally suitable in the process of this invention. The experiments were carried out in a fashion similar to that used in Example 1 except for the following: the all purpose dye was a Tintex® black dye prepared again according to the manufacturers instructions; the salt solutions used were potassium chloride (Example 4), magnesium chloride (Example 5) and sodium sulfate (Example 6) all in concentration of 300 gm/liter and the dye remaining in the solution after filtration was determined by visual inspection. Before filtration, the treated solutions appeared highly colored and completely opaque while after filtration the filtrates of Examples 4 and 5 were substantially clear with a slight dye tint, while that of Example 6, although equally clear had a slightly darker tint than those observed in Examples 4 and 5.

What is claimed is:

1. In a dyeing process for the production of color fast dyed textile articles wherein an undyed article is immersed in a dye bath for absorption of dye into its pores, and the dyed article having excess dye solution adhering to its surfaces is removed from said dye bath, the improvement which comprises:
   contacting the removed article and the excess dye solution adhering thereto in a precipitation zone with an aqueous solution of a salt selected from halides or sulfates of metals of Group IA or Group IIA of the Periodic Chart in amounts such that the concentration of salt in the precipitation zone is at least 100 grams per liter of total liquid to precipitate the dye absorbed in the pores, to rinse the excess dye from the article and to precipitate said excess dye;
   separating the precipitated dye from the aqueous salt solution substantially free of color,
   recovering the aqueous salt solution for reuse in the precipitation zone, and
   recovering a color fast dyed textile article.

2. A process according to claim 1, wherein the metal salt is a metal halide.

3. A process according to claim 2, wherein the metal halide is sodium chloride, potassium chloride or magnesium chloride, and the concentration of salt based on the total liquid volume in the precipitation zone is maintained in the range from about 200 to about 340 grams per liter.

4. A process according to claim 1 wherein salt solution containing the precipitated dye is contacted with an adsorbent material.

5. A process according to claim 4, wherein the adsorbent material is added to the precipitation zone and the precipitated dye and the adsorbent material is separated from the aqueous salt solution substantially free of color.

6. A process according to claim 1, wherein a filter is used to separate the precipitated dye from the aqueous salt solution substantially free of color and the filter is precoated with the adsorbent material.

7. A process according to claim 1 wherein after treatment in the precipitation zone, the article is rinsed with recirculating rinse water to remove salt solution adhering to the surface of the article, and excessive build-up of salt in the rinse water is prevented by removing at least a portion of the salt from said rinse water.

8. A process according to claim 7, wherein the salt removed is returned to the precipitation zone.

9. A process according to claim 7 wherein the salt is removed by reverse osmosis.

10. A process according to claim 7, wherein the salt is removed by ion exchange.

* * * * *